(12) United States Patent
Platner

(10) Patent No.: US 6,394,473 B1
(45) Date of Patent: May 28, 2002

(54) WEIGHT REDUCED FRONT STEER BEAMS

(75) Inventor: David K. Platner, Shelby, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/643,390

(22) Filed: Aug. 22, 2000

(51) Int. Cl.[7] ............................................... B62D 21/03
(52) U.S. Cl. ..................... 280/124.1; 280/799; 180/905
(58) Field of Search ................................ 280/124.1, 781, 280/799; 180/905; 301/124.1

(56) References Cited

U.S. PATENT DOCUMENTS

| | | | |
|---|---|---|---|
| 181,647 A | * 8/1876 | DeValin | |
| 1,248,037 A | 11/1917 | Thompson et al. | |
| 1,588,740 A | 6/1926 | Johnson | |
| 2,103,915 A | 5/1937 | Probst | |
| 2,150,199 A | * 3/1939 | Weston | |
| 2,275,349 A | 3/1942 | Collender | |
| 2,812,192 A | * 11/1957 | Cole | |
| 2,911,262 A | * 11/1959 | Franck | |
| 3,096,996 A | 7/1963 | Cole | |
| 3,761,108 A | 9/1973 | Hemmings | |
| 3,856,344 A | * 12/1974 | Loeber | |
| 5,588,660 A | * 12/1996 | Paddison | |
| 6,196,563 B1 | * 3/2001 | Haycraft | |

* cited by examiner

Primary Examiner—Avraham Lerner
(74) Attorney, Agent, or Firm—Carlson Gaskey & Olds

(57) ABSTRACT

A suspension system includes a steer beam of a generally I-beam like construction having a web and flanges. A plurality of lightening apertures are located through the web and by reinforcing the lightening apertures and adjusting the relationship of the web to the flanges a greatly lightened steer beam is provided without reducing the strength and rigidity thereof. The lightening apertures are preferably elongated slot-like apertures oriented along the length of the web. Each lightening aperture includes a reinforced area along its perimeter that is integrally formed within the web.

9 Claims, 1 Drawing Sheet

WEIGHT REDUCED FRONT STEER BEAMS

BACKGROUND OF THE INVENTION

The present invention relates to a vehicle suspension structural support, and more particularly to a front steer beam having a plurality of lightening holes.

Vehicles are commonly equipped with suspension systems which can include a vibration or shock absorbing device for absorbing road shock and other vibrations while providing a smooth and comfortable ride for the vehicle occupants. In addition, many suspension systems, particularly located toward the front of a vehicle include steerable wheel hub assemblies. One type of suspension system includes a primary structural support beam or front steer beam. The front steer beam is the primary support structure for a multiple of suspension components such as a shock absorbing system, torsion bar assemblies and steerable wheel hub assemblies.

In suspension systems of this type, the front steer beam is typically of rather substantial size and weight. The front steer beam must be of substantial construction to provide the stiffness and durability required to support the vehicle. However, as suspension system weight is typically a rather large portion of the vehicle's overall weight, it is generally preferable to reduce vehicle component weight.

It is known to provide a multiple of weight reduction measures in various frame components. However, because of the stiffness and durability requirements, weight reduction measures have heretofore not been applied to vehicle suspension support beams.

Accordingly, it is desirable to provide a suspension system support beam which provides substantial weight savings without sacrificing the stiffness required for strength and durability.

SUMMARY OF THE INVENTION

The suspension system according to the present invention generally includes a steer beam of a generally I-beam like construction having a web and flanges. A plurality of spring pads are preferably formed integrally with one flange.

Most preferably, a plurality of lightening apertures are located through the web. By reinforcing the lightening apertures and adjusting the relationship of the web to the flanges a greatly lightened steer beam is provided without reducing the strength and rigidity thereof.

The lightening apertures are preferably elongated slot-like apertures oriented along the length of the web. Each lightening aperture includes a reinforced area along its perimeter that is integrally formed within the web.

The present invention therefore provides a suspension system support beam having substantial weight savings while maintaining the stiffness required to assure suspension system strength and durability.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
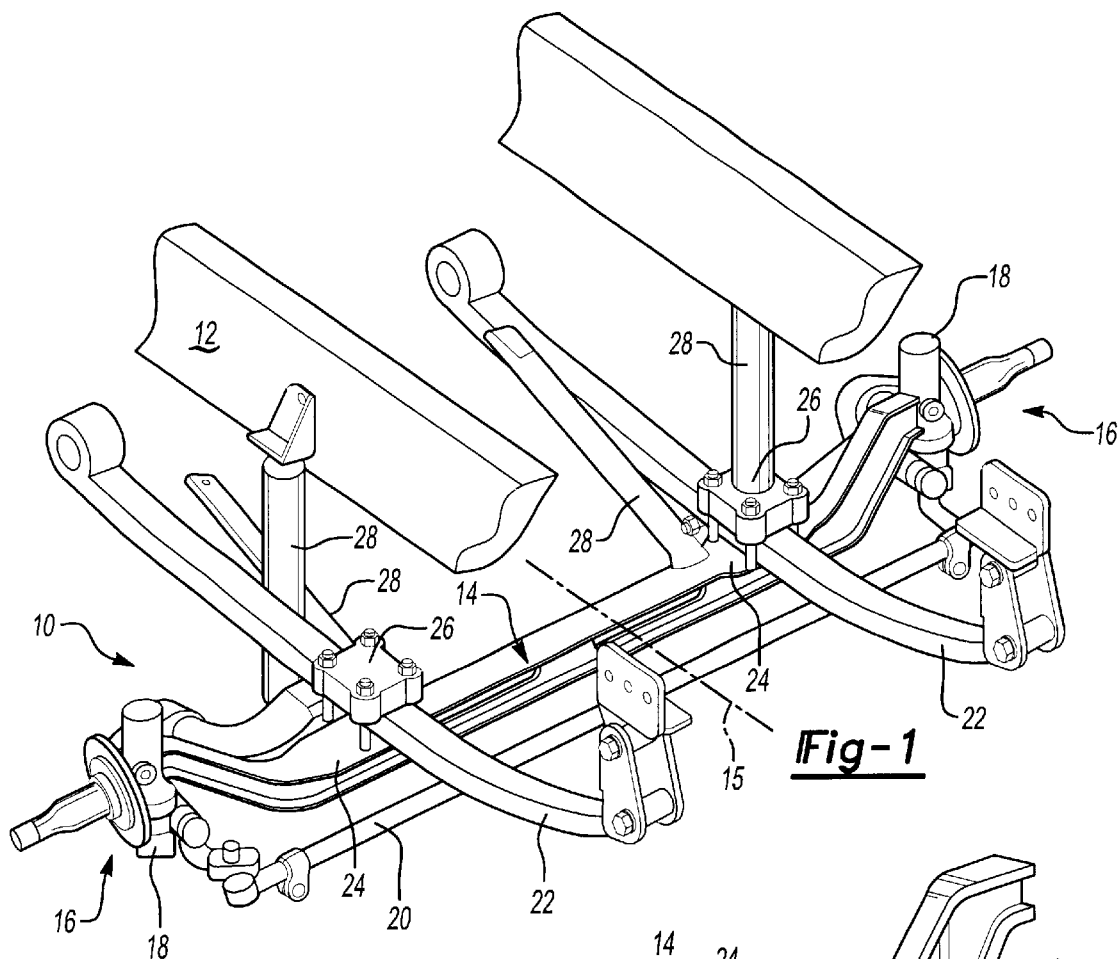
FIG. 1 is a general perspective view of a vehicle suspension system according to the present invention.

FIG. 1 illustrates a suspension system 10 for a vehicle 12 (shown schematically). The system 10 generally includes a primary structural support beam such as the front steer beam 14. The front steer beam 14 is preferably a single integral beam located transverse to a vehicle longitudinal axis 15. A pair of steerable hub assemblies 16 are preferably pivotally supported by the steer beam 14. A king pin 18 or the like pivotally attaches the steerable hub assembly 16 to the steer beam 14 in a known manner. The steerable hub assemblies 14 are articulatable through the use of steering gear (not shown) and are preferably linked together by a linkage 20.

To dampen movement of the steer beam 14, a shock absorber assembly 28 and leaf springs 22 are attached to respective spring pads 24. The spring pads 24 are reinforced areas of the steer beam 14 that increases the strength and rigidity of the steer beam 14 in a localized area. A clamp assembly 26 or the like preferably attaches the leaf springs 22 adjacent the spring pads 24 such that the leaf springs 22 are mounted substantially parallel to the vehicle longitudinal axis 15. Additional support links 28 can also be attached between the steer beam 14 and the vehicle 12.

Figure 2:
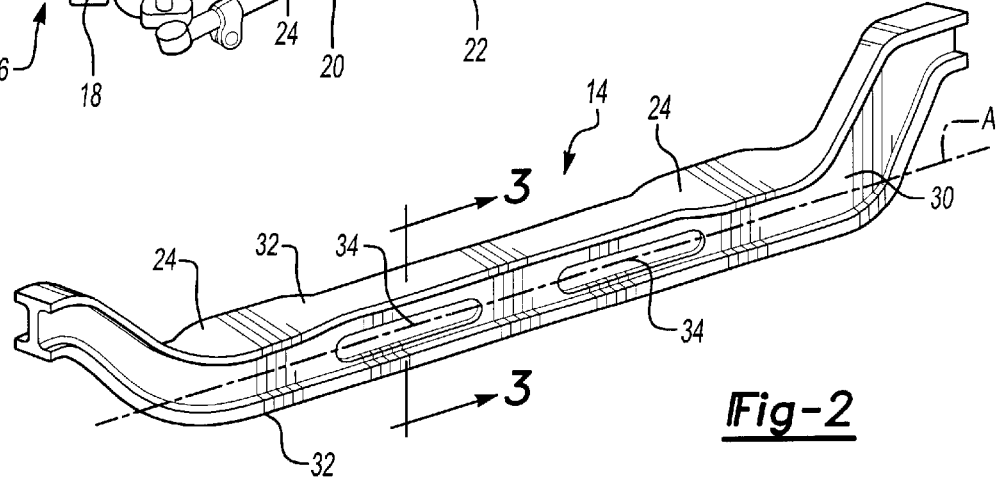
FIG. 2 is an expanded view of a front steer beam illustrated in FIG. 1.

Referring to FIG. 2, a steer beam 14 according to the present invention is illustrated. The steer beam 14 is preferably of a generally I-beam like construction having a web 30 and flanges 32. As is known, the size and relationship between the flanges 32 and the web 30, affects beam rigidity and strength. As illustrated in FIG. 2, the spring pads 24 are formed integrally with one flange 32.

Most preferably, a plurality of lightening apertures 34 are located through the web 30. Applicant has determined that by reinforcing the lightening apertures 34 (FIG. 3) and adjusting the relationship of the web 30 to the flanges 32 a greatly lightened steer beam 14 can be provided without reducing the strength and rigidity of the beam.

Figure 3:
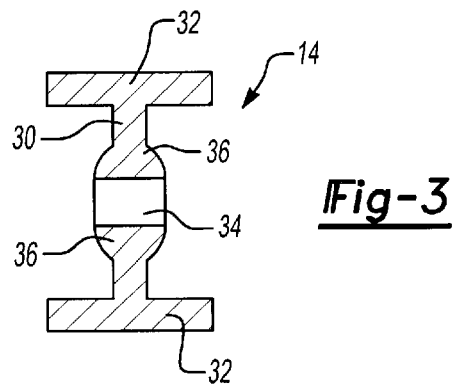
FIG. 3 is an expanded sectional view of a lightening aperture taken along line 3—3 of FIG. 2.

The lightening apertures 34 are preferably elongated slot-like apertures oriented along an axis A defined along the length of the web 30. That is, the apertures are substantially longer in a lateral direction along the beam, then in a vertical direction. Referring to FIG. 3, each lightening aperture 34 includes a reinforced area 36 along its perimeter. As can be seen, the reinforcing area is thicker then the nominal thickness of the web. The reinforced area 36 is preferably integrally formed within the web 30.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A front steer beam for a vehicle suspension system comprising:

a substantially I-beam shaped support beam having a web located between a first and a second flange, said web having a first thickness and a second thickness, said second thickness greater than said first thickness and each of said reinforced lightening apertures located through said second thickness;

a first and a second spring pad integrally formed with said first flange; and a plurality of reinforced lightening apertures located through said web.

2. The front steer beam as recited in claim 1, wherein said reinforced lightening apertures define a perimeter in said web, said reinforced lightening apertures reinforced along said perimeter.

3. The front steer beam as recited in claim 1, wherein each of said reinforced lightening apertures are elongated slots.

4. The system as recited in claim 3, wherein said elongated perimeter is oriented along a length of said web.

5. A vehicle suspension system comprising:

a substantially I-beam shaped steer beam having a web located between a first and a second flange, said web having a first thickness and a second thickness, said second thickness greater than said first thickness;

a first and a second steerable hub assembly pivotally mounted to said steer beam;

a first and a second spring pad integrally formed with said first flange;

a leaf spring mounted adjacent each of said spring pads; and a plurality of reinforced lightening apertures located through said second thickness of said web.

6. The system as recited in claim 5, wherein said lightening apertures are elongated slot-like apertures oriented along a length of said web.

7. The system as recited in claim 5, wherein said second thickness is defined within an elongated perimeter.

8. A vehicle front suspension system comprising:

a substantially I-beam shaped steer beam having a web located between a first and a second flange, said steer beam mounted transverse to a vehicle longitudinal axis, said web having a first thickness and a second thickness defining an elongated perimeter along a length of said web, said second thickness greater than said first thickness, a first and a second steerable hub assembly pivotally mounted to said steer beam;

a first and a second spring pad integrally formed with said first flange;

a leaf spring mounted adjacent each of said spring pads, said leaf springs mounted substantially parallel to said-vehicle longitudinal axis; and a reinforced lightening slot through said second thickness, said reinforced lightening slot located within said elongated perimeter.

9. The front steer beam as recited in claim 8, wherein said reinforced elongated lightening slot is oriented along an axis defined along said length of said web.

* * * * *